No. 893,611. PATENTED JULY 21, 1908.
W. H. H. DIFFENBAUCH.
RAILWAY BRAKE.
APPLICATION FILED MAR. 9, 1907.
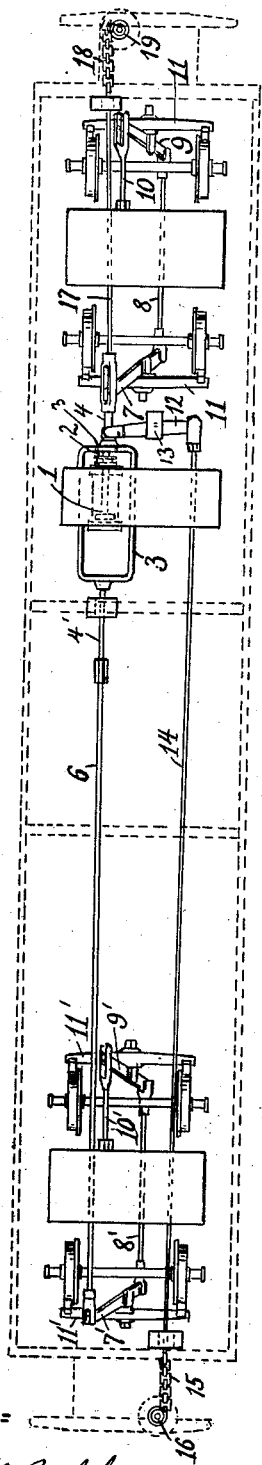
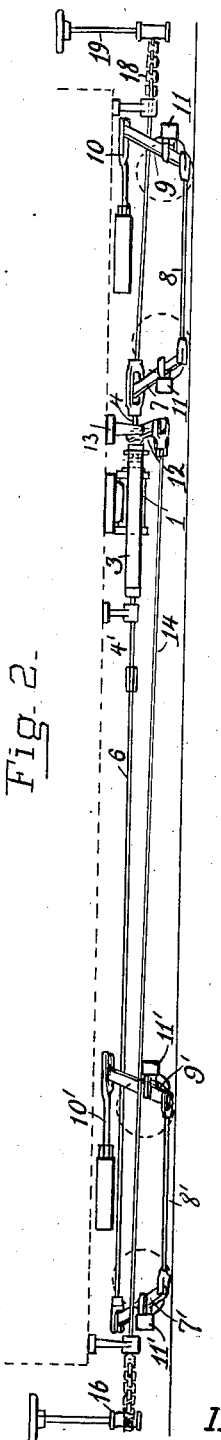
Witnesses:
Samuel W. Balgh
P. F. W. Ruther
Inventor,
William H. H. Diffenbauch,
by Waldo G. Morse.
Attorney.

UNITED STATES PATENT OFFICE.

WILLIAM H. H. DIFFENBAUCH, OF YONKERS, NEW YORK.

RAILWAY-BRAKE.

No. 893,611.     Specification of Letters Patent.     Patented July 21, 1908.

Application filed March 9, 1907. Serial No. 361,578.

*To all whom it may concern:*

Be it known that I, WILLIAM H. H. DIFFENBAUCH, a citizen of the United States, residing at the city of Yonkers, in the county of Westchester and State of New York, have invented certain new and useful Improvements in Railway-Brakes, of which the following is a specification.

While my invention is described as actuated by an air cylinder and applied to lever brakes upon a car with two trucks of two pairs of wheels each, it is not confined to such means of actuation or application, but the apparatus may be actuated by any power and used as a means for applying brakes upon any number of wheels, and by mechanism of any well-known construction.

In all existing mechanisms and methods proposed for the actuation of brakes by mechanical power such as compressed air, exhausted air, steam or springs, the impulse from the actuating power is transferred or transmitted to a lever or series of levers and rods often detached or floating, and always so arranged that the tightening of the brake upon each particular wheel or pair of wheels is essential to the tightening of the brake upon any of the other wheels reached by the system. One disadvantage of such construction is that the breaking or uncoupling of a single part renders inoperative the entire system, and prevents, unless overcome by a system of stops, the setting of any of the brake shoes which form a part of it either by the mechanical power or by the hand power appliances which are usually provided as auxiliary to the mechanical power, and the stops or checks such as have been proposed are liable to breakage or derangement when the power suddenly released by the breaking or dislodgment of a part, is thrown against the stop or rest designed to prevent the relaxing of the entire system.

My invention consists in the direct application of the power by which the brakes are set, by a thrust upon one set of brake levers or actuators, and a pull upon the other set of brake levers or actuators, in such manner that a breaking or derangement of one will in no way affect the normal operation of the other, and also the similarly independent application of the hand brake apparatus to the same system, likewise independently.

It is not deemed necessary to illustrate or describe the air pipes or means for supplying power, the same being well-known and constituting no part of my invention.

In the accompanying drawings, Figure 1 is a plan of the apparatus as applied to a well-known form of brakes adapted to passenger railroad cars, and Fig. 2 is a side elevation of the same.

In the drawings, similar figures indicate similar parts.

A compressed air cylinder 1 is rigidly supported from the body of the car in any usual and suitable manner. This cylinder contains a piston head of ordinary construction actuating the piston 2 which slides in suitable guides all in the usual way and bears loosely against the flattened disk-like surface forming a part of the link 3 which extends around the cylinder and which is of sufficient length to allow it to play backward and forward more than the length of the cylinder, and to which are fastened a shaft 4, and a shaft 4' at the opposite ends of the link, extending severally in either direction longitudinally in the line of the piston 2. The shaft 4 is sufficiently rigid to prevent it from buckling with the thrust of the piston, while the shaft 4' is of only sufficient strength and rigidity to maintain its position and resist the drawing tension to which it is subjected. The link 3 is fastened in any convenient manner and by preference rigidly to the shafts 4 and 4'. The shafts 4 and 4' and sides of the link 3 slide in and are held in place by supports fastened upon the frame of the car. The shaft 4 is jointed to the lever 7, that lever to the connecting rod 8, which is jointed to the lever 9, and the latter adjustably fastened at its end to the support 10 affixed to the body of the truck supporting the axles of the wheels, the two levers 7 and 9 carrying the brake beams and shoes 11. The shaft 4' is coupled to the rod 6, which is suitably supported longitudinally under the car and is jointed to the lever 7', that lever to the connecting rod 8', which is jointed to the lever 9', adjustably jointed at its upper end to the support 10', which is fastened to the body of the truck supporting the axles of the wheels, the two levers 7' and 9' carrying the brake beams and shoes 11'.

The construction so far described constitutes the brake mechanism as operated by power.

A lever 12 turning at its center upon a support 13 fastened to the body of the car engages at one end the shaft 4, and at the other end the rod 14, which extends longitudinally, suitably supported, under the body of the car. This rod is suitably linked to one end of a chain 15 which is affixed at its other end to the shaft and wheel 16 for hand brake operation in the usual manner at one end of the car, while the rod 17 is jointed to the shaft 4 and extends longitudinally, suitably supported under the body of the car, being linked to one end of the chain 18, which is affixed at its other end to the brake shaft and wheel 19 for hand operation in the usual manner at the other end of the car. The supports 10 and 10' are adjustably fastened in any suitable well-known way, so that the brake shoes 11 are made to bear upon the wheels simultaneously with the brake shoes 11', and that the natural elasticity of the levers 7—9 and 7'—9', which may be greater or less, as desired, will take up any slight wear or inequalities; or springs may be inserted at 10 and 10' or elsewhere in each brake system of levers and supports to increase its elasticity.

The shaft 4 may be shortened as desired, or the piston 2 may operate directly against the lever 7, in which case the link 3 is fastened to the lever 7; or the air cylinder may be placed out of line with the shafts 4 and 4' or out of line with one of them, and the thrust of piston 2 transmitted to the lever 7 and rod 6 by any convenient well-known means which will allow the lever and rod to be drawn and thrust in the direction to set the brakes independently of the piston 2 or else thrust and drawn in such direction by the operation of the piston 2 or both at pleasure, as the occasion may require. It is also obvious that the actuating cylinder may be placed upon the same side of both trucks and sets of brakes, and each set actuated by the draw of a rod, rather than one by a draw and the other by a thrust, both operating in the same direction, as in the application of my invention above particularly described.

In order to set the brakes by power, the air is admitted to the cylinder 1, and the piston 2 is forced against the plate or disk 3' and thus the link 3 and the shafts 4 and 4' are actuated, moving in the same direction, setting one pair of brakes through the piston 4 and lever 7, and the other through the rod 6 and the lever 7'.

In order to set the brake by hand, either independently of or concurrently with the operation of the power brake, either the wheel and shaft 16 are turned, drawing up the chain 15 and pulling toward them the rod 14 which actuates the lever 12 causing it to turn upon the pin 13 and the reverse end of said lever jointed to the shaft 4, and the shafts 4 and 4' and the whole brake mechanism as before are put in operation, the link 3 being drawn away from the end of the piston 2 in case the power actuating device is out of use. Or in case the wheel and shaft 19 are used, the chain 18 draws the bar 17, which directly actuated the shaft 4 and the entire mechanism as before. It is obvious that both hand wheels may be used simultaneously.

Having thus described my invention, I claim:

1. In a brake mechanism for vehicles, means for independently connecting, one by a thrust and the other by a pull forward, distinct systems of brakes with a source of mechanical power.

2. In a brake mechanism for vehicles, rods connected with a source of mechanical power set within a link, said rods being connected independently of each other with the several systems of brakes.

3. In a brake mechanism for vehicles, devices connected independently with a source of mechanical power, adapted to be actuated together by such power but to transmit the power independently of each other, actuating distinct systems of brakes, with means for separately taking up and adjusting lost motion in the several independent sets of brakes in such manner that all of the same will when set bear simultaneously upon the wheels.

4. In a brake mechanism for vehicles, rods connected with a source of mechanical power in such manner that they may be actuated together by such power but transmit the power independently of each other to distinct systems of brakes, each system or set of brakes being provided with separate and independent springs so arranged than any wear or inequality which may occur in adjustment will be overcome by yielding pressure causing all of the brakes to bear in unison.

5. In a brake mechanism for vehicles, rods connected with a source of mechanical power in such manner that they may be actuated together by such power but transmit the power independently of each other to distinct systems of brakes upon different sets of wheels, with means for separately taking up and adjusting lost motion in the several independent sets of brakes causing all of the same when set to bear simultaneously upon the wheels.

6. In a brake mechanism for vehicles, rods connected with a source of mechanical power in such manner that they may be actuated together by such power but transmit the power independently of each other to distinct systems of brakes upon different sets of wheels, each system or set of brakes being provided with separate and independent springs so arranged that any inequality which may occur in adjustment will be overcome by yielding pressure causing all of the brakes when set to bear in unison.

7. In a brake mechanism for vehicles, rods connected with a source of mechanical power in such manner that they may be actuated together by such power but transmit the power independently of each other to distinct systems of brakes, one rod being thrown and the other pulled forward in actuation, with means for separately taking up and adjusting lost motion in the several independent sets of brakes causing all of the same when set to bear simultaneously upon the wheels.

8. In a brake mechanism for vehicles, rods connected with a source of mechanical power in such manner that they may be actuated together by means of a cylinder and piston set within a link joining said rods which transmit the power independently of each other to several systems of brakes, each system or set of brakes being provided with separate and independent springs so arranged that any inequality which may occur in adjustment will be overcome by yielding pressure causing all of the brakes when set to bear in unison.

9. In a brake mechanism for vehicles, rods connected with a source of mechanical power in such manner that they may be actuated together by such power but transmit the power independently of each other to distinct systems of brakes, one rod being thrown and the other pulled forward in actuation, together with means for applying said brakes by hand either independently or in conjunction with the application of the brakes by power.

10. In a brake mechanism for vehicles, rods connected with a source of mechanical power in such manner that they may be actuated together by means of a cylinder and piston set within a link joining said rods, adapted to transmit the power independently of each other to several systems of brakes, together with means for applying said brakes by hand either independently or in conjunction with the application of the brakes by power.

11. In a brake mechanism for vehicles, rods connected with a source of mechanical power in such manner that they may be actuated together by such power but transmit the power independently of each other, to distinct systems of brakes, with means for separately taking up and adjusting lost motion in the several independent sets of brakes causing all of the same when set to bear simultaneously upon the wheels, together with means for applying said brakes by hand either independently or in conjunction with the application of the brakes by power.

12. In a brake mechanism for vehicles, rods connected with a source of mechanical power in such manner that they may be actuated together by such power but transmit the power independently of each other to distinct systems of brakes upon different sets of wheels, with means for separately taking up and adjusting lost motion in the several independent sets of brakes causing all of the same when set to bear simultaneously upon the wheels, together with means for applying said brakes by hand either independently or in conjunction with the application of the brakes by power.

13. In a brake mechanism for vehicles, rods connected with a source of mechanical power in such manner that they may be actuated together by such power but transmit the power independently of each other, to distinct systems of brakes upon different sets of wheels, each system of brakes being provided with independent springs so arranged that any inequality which may occur in adjustment will be overcome by yielding pressure causing all of the brakes to bear in unison, together with means for applying said brakes by hand either independently or in conjunction with the application of the brakes by power.

14. In a brake mechanism for vehicles, rods connected with a source of mechanical power in such manner that they may be actuated together by such power but transmit the power independently of each other to distinct systems of brakes, one rod being thrust and the other pulled forward in actuation, with means for separately taking up lost motion in the several independent sets of brakes so that all of the same when set bear simultaneously upon the wheels, together with means for applying said brakes by hand either independently or in conjunction with the application of the brakes by power.

In testimony whereof, I affix my signature in presence of two witnesses.

WILLIAM H. H. DIFFENBAUCH.

Witnesses:
 JESSIE DIFFENBAUCH,
 JOHN SCHALL.